US005288028A

United States Patent [19]

Spivak et al.

[11] Patent Number: 5,288,028

[45] Date of Patent: Feb. 22, 1994

[54] APPARATUS FOR ENHANCING THE FEEDING OF PARTICLES FROM A HOPPER

[75] Inventor: Philip Spivak, Tolucalake; Alan E. Opel, Monrovia, both of Calif.

[73] Assignee: Alpheus Cleaning Technologies Corp., Rancho Cucamonga, Calif.

[21] Appl. No.: 942,942

[22] Filed: Sep. 10, 1992

[51] Int. Cl.[5] .............................................. B65G 29/00

[52] U.S. Cl. .................................... 239/683; 239/142; 366/118; 366/132; 414/294; 222/63; 222/235

[58] Field of Search ..................... 239/683, 102.1, 142, 239/144, 71, 74; 222/52, 63, 64, 227, 233-235; 366/117, 118, 120, 124, 132; 198/533, 524, 550.01, 674, 675; 414/294, 161

[56] References Cited

U.S. PATENT DOCUMENTS

| | | | |
|---|---|---|---|
| 1,682,825 | 9/1928 | Bergerioux | 239/683 |
| 3,195,775 | 7/1965 | Thomas et al. | 222/52 |
| 3,363,806 | 1/1968 | Blakeslee et al. | |
| 3,602,394 | 8/1971 | McCure | 239/683 |
| 4,361,117 | 11/1982 | Tohme | |
| 4,408,889 | 10/1983 | Peschl | |
| 4,412,762 | 11/1983 | Lepley et al. | |
| 4,597,358 | 7/1986 | Aitken | |
| 4,646,941 | 3/1987 | Grosse-Scharmann et al. | 239/74 |
| 4,850,541 | 7/1989 | Hagy | |
| 4,983,045 | 1/1991 | Taniguchi | 366/117 |
| 5,071,289 | 12/1991 | Spivak | |

FOREIGN PATENT DOCUMENTS

| | | | |
|---|---|---|---|
| 0222258 | 5/1987 | European Pat. Off. | 239/74 |
| 283510 | 2/1973 | U.S.S.R. | 222/235 |
| 850634 | 8/1981 | U.S.S.R. | |
| 1142393 | 2/1985 | U.S.S.R. | |
| 1274905 | 12/1986 | U.S.S.R. | |
| 1503702 | 8/1989 | U.S.S.R. | |

OTHER PUBLICATIONS

Dialog Database Search Excerpts-World Patents Index, produced by Derwent Publications, Ltd., London, England; 3 pp.; May 13, 1992.

*Primary Examiner*—Karen B. Merritt
*Attorney, Agent, or Firm*—Sheldon & Mak

[57] ABSTRACT

Apparatus for enhancing the feeding of particles includes a hopper having a central axis, walls of the hopper being concentric with the hopper axis above an outlet of the hopper; a sensor for sensing a desired flow of particles from the hopper; a shaft rotatably mounted on the hopper axis; a paddle connected to the shaft and extending from approximately 0.125 inch to approximately 0.250 inch from at least a lower portion of an inside surface wall of the hopper, the shaft being rotated at approximately 1 radian per second in response to a drive signal; the drive signal being momentarily activated in the presence of an external activate signal when the flow of particles falls below the desired rate, the drive signal being active for a period of time sufficient to cause the paddle to move through an angle of about 90° about the hopper axis. The paddle is mechanically agitated during feeding of the particles, the paddle vibrating only during activation of the external signal, with a displacement of from 0.01 inch to 0.1 inch when contacting the particles.

26 Claims, 2 Drawing Sheets

APPARATUS FOR ENHANCING THE FEEDING OF PARTICLES FROM A HOPPER

BACKGROUND

The present invention relates to systems for transporting particulate materials, and more particularly to a system for feeding such particles from a hopper.

A number of schemes for agitating particles in a hopper are known for promoting flow from the hopper. However, many of these degrade the particles, particularly where the particles are fragile and there is a need to preserve their original form. Such is the case in blasting for surface treatment of a workpiece when it is important to keep the particles sharply defined as to form and size.

In an important class of systems for transporting particulates, pellets or particulates of a hygroscopic or deliquescent material are used, often in a very cold or frozen condition. Excessive agitation of this class of particulates is undesirable because of the resultant wear and pulverization of the particles. The heating associated with the agitation is also undesirable. Also, the incorporation of thermal insulation in the design of the hopper is made more difficult by the presence of agitator components. Further, the introduction of air into the hopper should be minimized for avoiding deleterious heat and/or moisture exchange with the pellets.

A further consideration in particulate feeders is that it may be required that the particles be fed gradually. A disadvantage of some feeders is that they clog at low to moderate feed rates.

Thus there is a need for a particulate delivery system that effectively and reliably feeds the material, even at low and moderate flow rates, while avoiding the other disadvantages of the prior art.

SUMMARY

The present invention meets this need by providing a mechanical agitator that has controlled intermittent movements in response to a sensed condition of blockage. In one aspect of the invention, the apparatus includes a hopper having a bottom hopper outlet and an inside surface extending from the bottom hopper outlet, the hopper having a lateral width; sensing means for sensing flow of particles from the hopper; a paddle member movably mounted in the hopper for moving proximate the inside hopper surface; drive means for moving the paddle member in response to a drive signal; and control means responsive to an external activate signal and to the sensing means for momentarily activating the drive signal when there is an absence of flow from the hopper outlet during activation of the external signal. The drive signal is activated for a period of time sufficient to cause an extremity portion of the paddle member to move in a plane a distance less than double the lateral width of the hopper in the plane. The distance of movement can be approximately one third of the lateral width.

In another aspect of the invention, the apparatus includes the hopper having a central axis, walls of the hopper being concentric with the hopper axis above an outlet of the hopper; the sensing means; a shaft rotatably mounted on the hopper axis; a paddle member connected to the shaft and extending proximate an inside surface wall of the hopper; the drive means; and the control means responsive to an external activate signal and to the sensing means for momentarily activating the drive signal during activation of the external signal upon occurrence of activation of the sensing means by absence of flow from the hopper outlet, the drive signal being active for a period of time sufficient to cause the paddle member to move through an angle about the hopper axis, the angle being less than approximately one revolution of the paddle member.

The angle of paddle movement can be not less than approximately 10°. Preferably the angle is approximately 90°. The paddle member can move approximately 1 radian per second. The paddle member can move at a spacing of from approximately 0.125 inch to approximately 0.50 inch from at least a lower portion of the hopper. Preferably the spacing is not more than approximately 0.250 inch. An alternative preference, for use with larger particles, is for the spacing to be not less than approximately 0.250 inch. There can be a plurality of the paddle members, spaced about the hopper axis. Preferably there are four of the paddle members, orthogonally spaced about the hopper axis. The paddle members can have the spacing of from approximately 0.125 inch to approximately 0.50 inch from the lower portion of the hopper. The lower portion of the hopper can be cone-shaped.

The particles can be mechanically agitated by the paddle member during feeding of the particles. Preferably the paddle member vibrates with a displacement of from 0.01 inch to 0.1 inch when contacting the particles. More preferably, the displacement is approximately 0.04 inches. The paddle member can vibrate only during activation of the external signal.

In a further aspect of the invention, the apparatus includes the hopper, the shaft rotatably mounted on the hopper axis, the paddle member, the drive means for rotating the shaft in response to the drive signal; control means responsive to an external activate signal for periodically activating the drive signal during activation of the external signal, the drive signal being active for a period of time sufficient to cause the paddle member to move through an angle about the hopper axis, the angle being less than approximately one revolution of the paddle member; and means for mechanically agitating the paddle member during feeding of the particles.

DRAWINGS

These and other features, aspects, and advantages of the present invention will become better understood with reference to the following description, appended claims, and accompanying drawings, where:

DESCRIPTION

Figure 1:
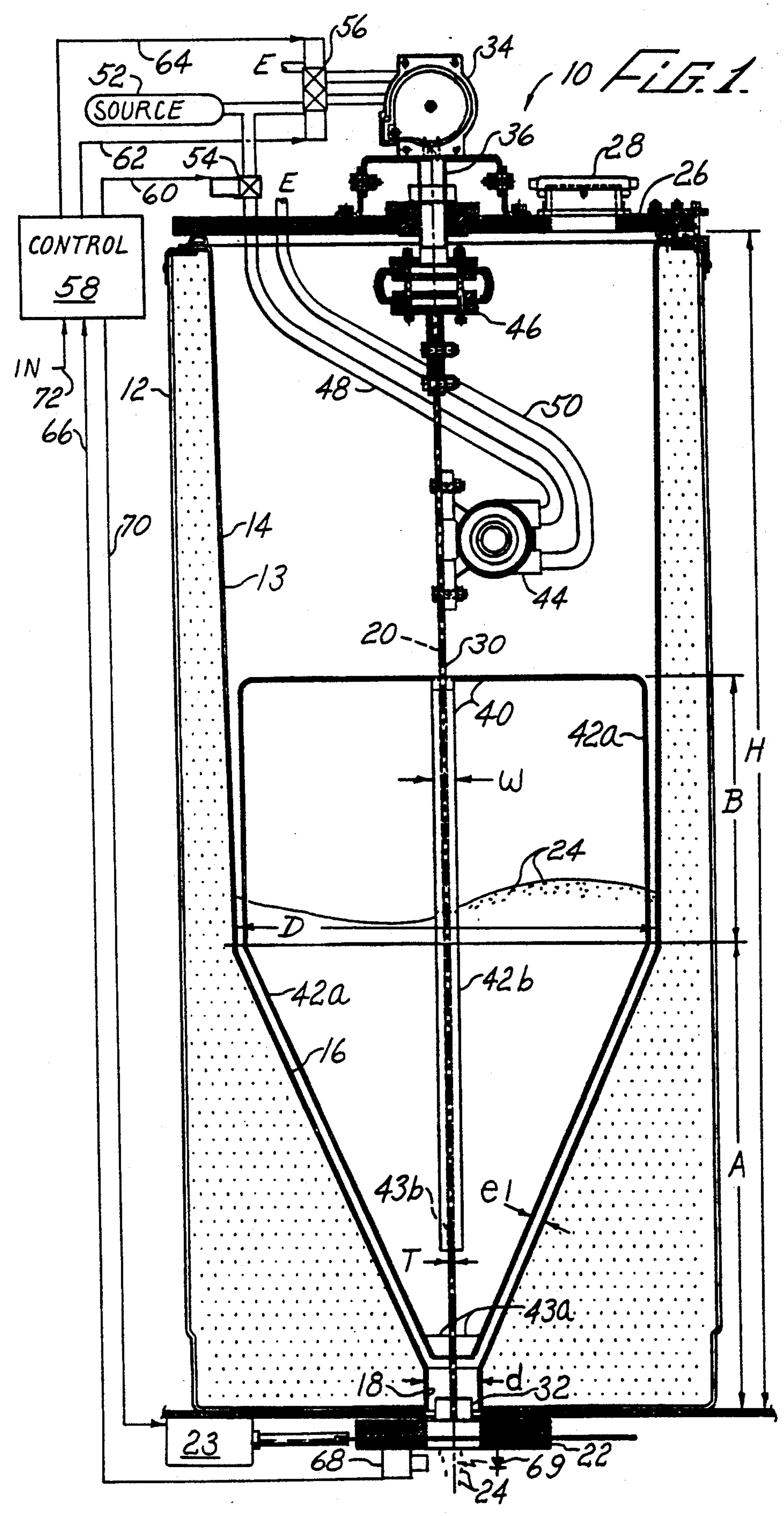
FIG. 1 is a composite front sectional elevational view and functional block diagram of a hopper delivery system according to the present invention.

The present invention is directed to a hopper unit that is particularly effective in reliably feeding a hygroscopic particulate at low and moderate rates and without excessively degrading the particles. With reference to FIGS. 1–4 of the drawings, a hopper unit 10 includes an insulated hopper body 12 having a hopper cavity wall 13 therein, the wall 13 including a substantially cylindrical upper wall portion 14 of inside diameter D, and a conical lower portion 16. A cylindrical outlet opening 18 having an outlet diameter d is formed at a lower extremity of the conical lower wall portion 16; the cylindrical upper wall portion 14, the conical lower wall portion 16, and the outlet opening 18 being concentric with a vertical hopper axis 20. The conical lower wall portion 16 extends upwardly from the outlet opening 18 by a distance A. An outlet gate valve 22 covers the outlet opening 18 for selectively feeding particles 24 from the hopper unit 10, the gate valve 22 having an associated valve actuator 23. A thermally insulative cover plate 26, located at a height H above the outlet opening 18, is sealingly fastened to an upper extremity of the hopper body 12, the plate 26 having an openable inlet 28 for receiving the particles 24. According to the present invention, a vertically oriented actuator bar 30 is rotatably mounted within the hopper body 12 on the hopper axis 20, a lower extremity of the bar 30 extending within the outlet opening 18. A exemplary form of the bar 30 is of uniform width W and thickness T, the width W being somewhat less than the diameter d of the outlet opening 18. A pair of guide fins 32 extend from opposite sides of the bar 30 at the bottom extremity thereof to an overall fin width W', the width W' being approximately the same as the width W, the combination of the bar 30 and the guide fins 32 within the opening 18 guiding a lower portion of the bar 30 approximately concentric with the hopper axis 20.

A rotary actuator 34 is mounted above the plate 26, an actuator shaft 36 extending downwardly on the hopper axis 20 through a thrust bearing 38 that protrudes the plate 26 for rotating the bar 30. An agitator frame 40 is rigidly connected to bar 30, the frame 40 having a plurality of rib members 42 that extend generally parallel to the conical lower wall portion 16 and to a distance B above the conical lower portion 16 within the cylindrical upper wall portion 14 of the hopper body 12, the rib members 42 functioning as paddles for facilitating feeding of the particles 24. Upper extremities of the rib members 42 extend generally horizontally inwardly from proximate the wall portion 14, making rigid connection to the bar 30. The rib members 42, in an exemplary configuration of the present invention, are formed as elongate strips of a high strength material such as corrosion-resistant steel, having a radial thickness t and a circumferential width w. A pair of the rib members, designated first rib members 42*a*, extend on opposite sides of the bar 30, upwardly and outwardly from a first elevation c1 above the outlet opening 18, being approximately uniformly spaced from the hopper body 12 by a distance e1.

Bottom extremities of the rib members 42*a* are connected in spaced relation to the bar 30 by respective first fins 43*a*. Similarly, a pair of second rib members 42*b*, orthogonally spaced from the rib members 42*a*, extend upwardly and outwardly from an elevation c2, being spaced from the body 12 by a distance e2, respective second fins 43*b* connecting the bar 30 in spaced relation to bottom extremities of the rib members 42*b*.

A vibrator unit 44 is mounted to the bar 30 above the frame 40 for vibrating the frame 40, a damper coupling 46 being connected between the bar 30 and the actuator shaft 36 for permitting dynamically limited movement of the bar 30 and frame 40 relative to the shaft 36. In an exemplary configuration of the hopper unit 10, the vibrator unit 44 is implemented as an air-driven motor having an eccentric load, the vibrator unit 44 having connected thereto an air supply line 48 and an exhaust line 50, the lines 48 and 50 extending through the plate 26, the actuator 34 likewise being air-driven as described herein.

The air supply line 48 is fed from a suitable compressed air supply 52 through a one-way valve 54. The actuator 34 is bidirectionally controlled by a 4-way valve 56. Each of the valves 54 and 56 are solenoid valves having suitable connections to a control unit 58. In particular, the one-way valve 54 is driven by a vibrate signal 60 and the four-way valve 56 is driven by a forward signal 62 for driving the actuator 34 in a forward direction, and by a reverse signal 64 for driving the actuator 34 in an opposite, reverse direction from the air supply 52. The control unit 58 receives a sensor signal 66 from an optical sensor 68 that is mounted below the gate valve 22 for monitoring the flow of the particles 24 from the hopper unit 10, sensor 68 typically having associated therewith appropriate illumination means 69 whereby light to the sensor 68 is blocked by the falling particles 24. It is understood that the sensor signal 66 is conditioned by the sensor 68 to be active when a predetermined flow rate of the particles 24 is not being produced from the gate valve 22. Alternatively, a counterpart of the sensor signal 66 having the above attributes is generated within the control unit 58.

The control unit 58 further provides a gate signal 70 to the valve actuator 23 for operating the gate valve 22 in a conventional manner. It will be understood that the gate valve 22, the valve actuator 23, and the gate signal 70 can provide two valve positions (fully open and fully closed), or proportional control, within the scope of the present invention.

Figure 4:
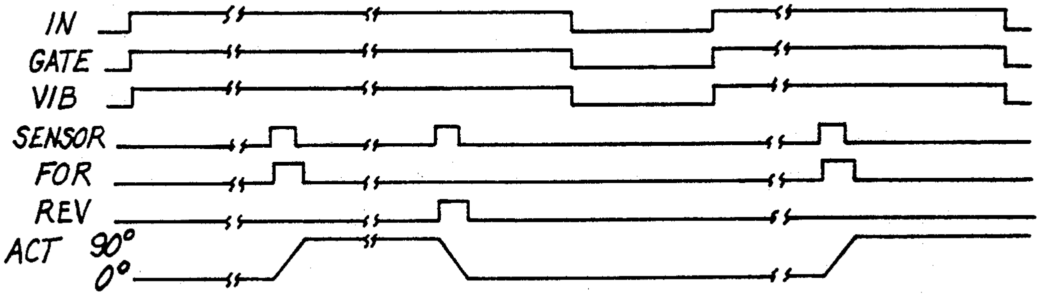
FIG. 4 is a timing diagram for the system of FIG. 1.

In operation, the particles 24 are loaded in the hopper unit 10 from the inlet 28. With particular reference to FIG. 4, when feeding of the particles 24 is to commence, an input signal 72 (IN) activates the control unit 58, the outlet gate valve 22 being opened in response to the gate signal 70 (GATE) and the one-way valve 54 being actuated for activating the vibrator unit 44 in response to the vibrate signal 60 (VIB). The resulting oscillation of the rib members 42 induces adjacent ones of the particles 24 to flow downward to the outlet opening 18 for supporting a constant feeding of the particles 24.

In the event that a void region develops surrounding the rib members 42 and fewer of the particles 24 than desired are exiting the hopper unit 10, the sensor signal 66 (SENSOR) is activated. In response to activation of the sensor signal 66, the control unit 58 activates one of the forward and reverse signals 62 (FOR) and 64 (REV) for producing a rotation of the actuator shaft 36 (ACT) and the frame 40 through a predetermined angle of rotation (approximately 90°) in one direction. The activation of the signal 62 or 64 operates the four-way valve 56 for driving the actuator 34 in a corresponding forward or reverse direction. In an exemplary implementation of the present invention, the four-way valve 56 is activated for approximately one second, during which time the frame 40 rotates the approximate 90°. The rib members 42 thus come into contact with a fresh batch of the particles 24, simultaneously undercutting a layer of the particles 24 that may have formed on the hopper cavity wall 13 of the hopper body 12, the particles 24 again flowing from the gate valve 22 and interrupting the sensor signal 66 from the sensor 68. When the feeding of the particles 24 from the gate valve 22 is subsequentially interrupted by a new void, the sensor signal 66 being reactivated, the control unit 58 activates the reverse signal 64 for producing reverse rotation of the frame 40. Thus each subsequent activation of the actuator 34 is in a direction opposite the previous activation thereof, by alternate activations of the forward signal 62 and the reverse signal 64.

An experimental prototype of the hopper unit 10 has been built and tested, the diameter D being approximately 21 inches, the height H being approximately 58 inches, the distance A being approximately 23 inches, and the distance B being approximately 13 inches. The diameter d was approximately 2.5 inches and the height C was approximately 2.35 inches. The thickness T and the width W of the bar 30 were approximately 0.25 and 1.5 inches respectively, and the corresponding dimensions t and w of the rib members 42 were approximately 0.16 and 1.25 inches respectively. A preferred spacing e1 of the first rib members 42A was determined to be from about 0.125 inch to about 0.250 inch, and a correspondingly preferred spacing e2 of the lower portion of the second rib members **42*b* was also from about 0.125 inch to about 0.250 inch, the particles 24 being formed of solid $CO_2$ and maintained at about −109° F., having a selected size from about 0.04 inch diameter and 0.10 inch long to about 0.125 inch diameter and 0.25 inch long. The spacings e1 and e2 can be increased to about 0.5 inch, but should not be less than the maximum dimension of the particles 24**.

The vibrator unit was driven at rates of from about 10 KRPM to about 15 KRPM during activation of the input signal 72, the rib members vibrating at an amplitude of about 0.04 inch when the hopper unit 10 had a significant supply of the particles 24 therein. Flow rates of the particles 24 were maintained at various levels between 2 and 10 pounds per minute, the hopper unit 10 being believed capable of higher flow rates such as 15 pounds per minute. It was observed that a desired flow rate of the particles, approximately 6 pounds per minute, was typically maintained for intervals of from 1 minute to 15 minutes without activation of the actuator. Upon activation of the sensor signal, the desired flow rate resumed within about 0.5 second, typically within 0.3 second.

Accordingly, the present invention provides an effective and reliable apparatus for delivery of controlled quantities of relatively fragile particulate at moderate flow rates.

Figure 5:
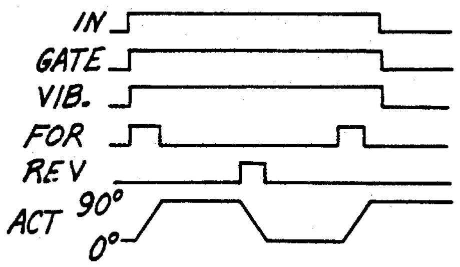
FIG. 5 is a timing diagram for an alternative configuration of the system of FIG. 1.
Figure 2:
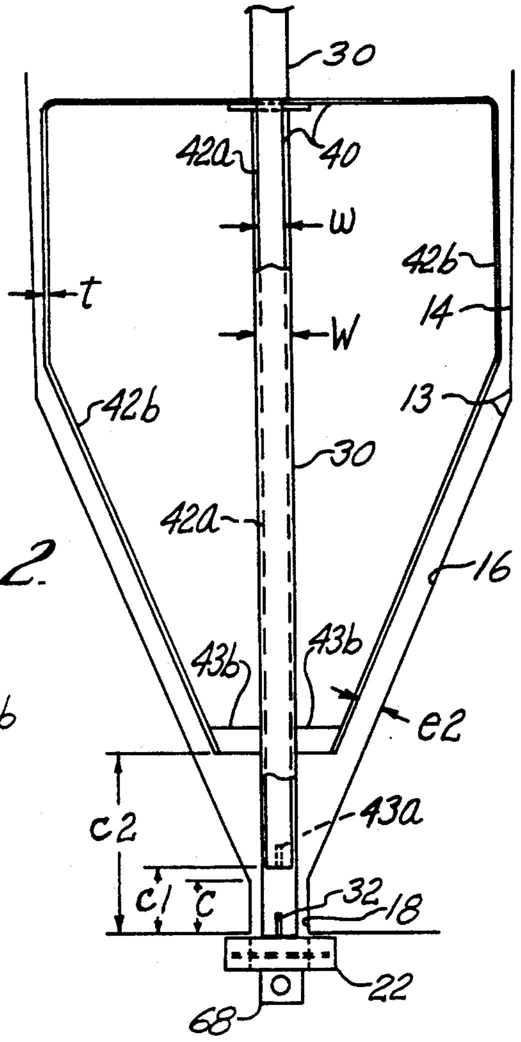
FIG. 2 is a fragmentary sectional right side view of a portion of the system of FIG. 1.
Figure 3:
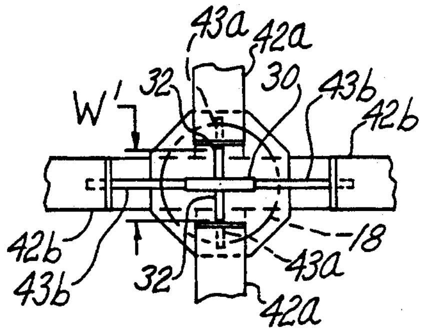
FIG. 3 is a bottom plan detail view of the system portion of FIG. 2.

With further reference to FIG. 5, an alternative configuration of the hopper apparatus 10 does not include the sensor 68, but instead periodically activates the actuator 34 at regular intervals during feeding of the particles 24. In particular, one of the signals 62 and 64, for example the forward signal 62, is activated for approximately one second upon activation of the input signal 72. After a delay of between one second and one minute, as long as the input signal 72 remains active, the reverse signal 64 is activated, the signals 62 and 64 being alternately activated in a continuing sequence during feeding of the particles. Following interruption of the input signal 72, the next activation thereof would preferably initiate activation of the other of the signals 62 and 64 than that last activated in the previous activation of the input signal 72.

Although the present invention has been described in considerable detail with reference to certain preferred versions thereof, other versions are possible. For example, a multitude of agitators (counterparts of the actuator 34, the bar 30, and the frame 40) of similar shape, at spaced hopper axes of an elongated hopper having several counterparts of the outlet opening 18. Therefore, the spirit and scope of the appended claims should not necessarily be limited to the description of the preferred versions contained herein.

What is claimed is:

1. Apparatus for enhancing the feeding of particles, comprising:

(a) a hopper having a bottom hopper outlet and an inside surface extending from the bottom hopper outlet, the hopper having a lateral width;

(b) sensing means for sensing flow of particles from the hopper;

(c) a paddle member movably mounted in the hopper for moving approximately horizontally proximate the inside hopper surface without blocking the hopper outlet, an extremity portion of the paddle member moving in a plane approximately across the lateral width of the hopper in the plane;

(d) drive means for moving the paddle member in response to a drive signal;

(e) control means responsive to an external activate signal and to the sensing means for momentarily activating the drive signal during activation of the external signal upon occurrence of activation of the sensing means by absence of flow from the hopper outlet, the drive signal being active for a period of time sufficient to cause the extremity portion of the paddle member to move a distance less than double the lateral width of the hopper in the plane.

2. The apparatus of claim 1, wherein the distance is approximately one third of the lateral width.

3. The apparatus of claim 1, wherein the paddle member extends upwardly in parallel spaced relation to the inside hopper surface from proximate the hopper outlet.

4. The apparatus of claim 1, wherein the feeding is on demand, the apparatus further comprising an outlet valve in fluid communication with the hopper outlet, the outlet valve being operable by the control means in response to the external activate signal.

5. Apparatus for enhancing the feeding of particles, comprising:

(a) a hopper having an approximately vertically oriented central axis, walls of the hopper being concentric with the hopper axis above an outlet of the hopper;

(b) sensing means for sensing flow of particles from the hopper;

(c) a shaft rotatably mounted on the hopper axis;

(d) a paddle member connected to the shaft and extending proximate an inside surface wall of the hopper without blocking the outlet;

(e) drive means for rotating the shaft in response to a drive signal;

(f) control means responsive to an external activate signal and to the sensing means for momentarily activating the drive signal during activation of the external signal upon occurrence of activation of the sensing means by absence of flow from the hopper outlet, the drive signal being active for a period of time sufficient to cause the paddle member to move through an angle about the hopper axis, the angle being less than approximately one revolution of the paddle member.

6. The apparatus of claim 5, wherein the angle is not less than approximately 10°.

7. The apparatus of claim 6, wherein the angle is approximately 90°.

8. The apparatus of claim 5, wherein the paddle member moves approximately 1 radian per second.

9. The apparatus of claim 5, wherein the paddle member is spaced from approximately 0.125 inch to approximately 0.50 inch from at least a lower portion of the hopper.

10. The apparatus of claim 9, wherein the spacing is not more than approximately 0.250 inch.

11. The apparatus of claim 9, wherein a maximum dimension of the particles is not more than about 0.250 inch, the spacing being not less than approximately 0.25 inch.

12. The apparatus of claim 5, further comprising a plurality of the paddle members, the paddle members being spaced about the hopper axis.

13. The apparatus of claim 12, wherein there are four of the paddle members, the paddle members being orthogonally spaced about the hopper axis.

14. The apparatus of claim 13, wherein the paddle members having a spacing of from approximately 0.125 inch to approximately 0.50 inch from a lower portion of the hopper.

15. The apparatus of claim 12, wherein the paddle members extend upwardly in parallel spaced relation to the walls of the hopper, at least some of the paddle members so extending from proximate the hopper outlet.

16. The apparatus of claim 5, wherein a lower portion of the hopper is cone-shaped.

17. The apparatus of claim 5, further comprising means for mechanically agitating the paddle member during feeding of the particles.

18. The apparatus of claim 17, wherein the means for agitating vibrates the paddle member with a displacement of from 0.01 inch to 0.1 inch when contacting the particles.

19. The apparatus of claim 18, wherein the displacement is approximately 0.04 inches.

20. The apparatus of claim 17, wherein the means for agitating vibrates the paddle member only during activation of the external signal.

21. The apparatus of claim 5, wherein the paddle member extends upwardly in parallel spaced relation to the walls of the hopper from proximate the hopper outlet.

22. The apparatus of claim 5, wherein the feeding is on demand, the apparatus further comprising an outlet valve in fluid communication with the hopper outlet, the outlet valve being operable by the control means in response to the external activate signal.

23. Apparatus for enhancing the feeding of particles, comprising:

(a) a hopper having a central axis, walls of the hopper being concentric with the hopper axis above an outlet of the hopper;

(b) a shaft rotatably mounted on the hopper axis;

(c) a paddle member connected to the shaft and extending proximate an inside surface wall of the hopper;

(d) drive means for rotating the shaft in response to a drive signal;

(e) control means responsive to an external activate signal for periodically activating the drive signal during activation of the external signal, the drive signal being active for a period of time sufficient to cause the paddle member to move through an angle about the hopper axis, the angle being less than approximately one revolution of the paddle member; and (f) means for mechanically agitating the paddle member during feeding of the particles.

24. The apparatus of claim 23, wherein the feeding is on demand, the apparatus further comprising an outlet valve in fluid communication with the hopper outlet, the outlet valve being operable by the control means in response to the external activate signal.

25. Apparatus for enhancing the feeding of particles, comprising:

(a) a hopper having a central axis, walls of the hopper being concentric with the hopper axis above an outlet of the hopper;

(b) sensing means for sensing flow of particles from the hopper;

(c) a shaft rotatably mounted on the hopper axis;

(d) a paddle member connected to the shaft and extending from approximately 0.125 inch to approximately 0.50 inch from at least a lower portion of an inside surface wall of the hopper, the paddle member extending upwardly in parallel spaced relation to the inside surface wall of the hopper from proximate the hopper outlet;

(e) drive means for rotating the shaft in response to a drive signal, the shaft moving approximately 1 radian per second;

(f) control means responsive to an external activate signal and to the sensing means for momentarily activating the drive signal during activation of the external signal upon occurrence of activation of the sensing means by absence of flow from the hopper outlet, the drive signal being active for a period of time sufficient to cause the paddle member to move through an angle about the hopper axis, the angle being approximately 90°;

(g) means for mechanically agitating the paddle member during feeding of the particles, the means for agitating vibrating the paddle member with a displacement of from 0.01 inch to 0.1 inch when contacting the particles only during activation of the external signal.

26. The apparatus of claim 25, wherein the feeding is on demand, the apparatus further comprising an outlet valve in fluid communication with the hopper outlet, the outlet valve being operable by the control means in response to the external activate signal.

* * * * *